United States Patent [19]
Fusinato

[11] Patent Number: 5,949,865
[45] Date of Patent: Sep. 7, 1999

[54] MANAGEMENT OF CALLING NAME DELIVERY IN TELEPHONE NETWORKS PROVIDING FOR TELEPHONE NUMBER PORTABILITY

[75] Inventor: Lynn H. Fusinato, Flower Mound, Tex.

[73] Assignee: Ericsson Inc., Research Triangle Park, N.C.

[21] Appl. No.: 08/914,670

[22] Filed: Aug. 18, 1997

[51] Int. Cl.⁶ .............................. H04M 3/42; H04M 7/00
[52] U.S. Cl. .................... 379/207; 379/220; 379/230; 379/219
[58] Field of Search .................................. 379/201, 207, 379/211, 111, 112, 113, 219, 220, 229, 230

[56] References Cited

U.S. PATENT DOCUMENTS

| | | | |
|---|---|---|---|
| 5,206,899 | 4/1993 | Gupta et al. | 379/120 |
| 5,625,681 | 4/1997 | Butler, II | 379/220 |
| 5,757,900 | 5/1998 | Nagel et al. | 379/230 |
| 5,778,057 | 7/1998 | Atai | 379/220 |
| 5,854,836 | 12/1998 | Nimmagadda | 379/221 |
| 5,867,562 | 2/1999 | Scherer | 379/229 |
| 5,867,570 | 2/1999 | Bargout et al. | 379/230 |

FOREIGN PATENT DOCUMENTS 0 710 042    5/1996   European Pat. Off. .
WO 97/29579  8/1997   WIPO .

*Primary Examiner*—Harry S. Hong
*Assistant Examiner*—Benny Q. Tieu
*Attorney, Agent, or Firm*—Robert A. Samra

[57] ABSTRACT

A system and a method for managing calling name (CNAM) queries in a plurality of telephone networks including a plurality of subscribers each assigned a telephone number in a predetermined number series associated with a particular switch in one of the telephone networks, wherein at least one of the number series is a portable number series including telephone numbers assigned by one network but connected to another network. According to the present invention, if the calling party number (CgPN) belongs to a portable number series, gapping will be applied to CNAM queries containing either portable telephone numbers associated with a location routing number (LRN) identifying the switch and network to which the CgPN is connected, or non-portable telephone numbers belonging to the same number series as the LRN. On the other hand, if the CgPN does not belong to a portable number series, gapping will be applied to CNAM queries containing telephone numbers belonging to the same number series as the CgPN.

15 Claims, 3 Drawing Sheets

MANAGEMENT OF CALLING NAME DELIVERY IN TELEPHONE NETWORKS PROVIDING FOR TELEPHONE NUMBER PORTABILITY

BACKGROUND OF THE INVENTION

1. Technical Field

The present invention relates to the network management of services or features in telephone networks and, more specifically, to the network management of the calling name (CNAM) service in telephone networks which also provide a number portability (NP) service.

2. Related Prior Art

Historically, telephone companies introduced new calling services or features for their customers through new releases of the software used in their switches. This, however, resulted in a slow introduction of new services and the restriction of those services to whatever new features were included in the latest software release from the switch vendors. In response to these problems, the telephone industry developed a new network design, known as the Intelligent Network (IN), which distributes at least some of the intelligence (software) underlying the provision of calling services out of the switch and into peripheral call processing computers. The local switch can access these computers during call processing so as to deliver the desired services.

In early implementations of the IN architecture, the switch maintained control over the call processing and merely requested and received data from the peripheral devices. In current implementations of the IN architecture, however, at least some of the intelligence to process calls may be offloaded from the switch to a service control point (SCP) whose software can be readily modified by the local carrier in order to provide new calling services (e.g., voicemail). The SCP may delegate some of the tasks of call processing to one or more intelligent peripherals (IPs) which operate as slave processors to the SCP and can provide a variety of resources (e.g., voice recognition).

The current IN architecture may further include a service node (SN), which comprises a standalone computer platform dedicated to providing a particular calling service autonomously (i.e., independently of the SCP or the switch). The various IN elements or nodes (i.e., switches, SCPs, IPs and SNs) are interconnected by a common channel signaling (CCS) data network which uses, for example, the Signaling System No. 7 (SS7) protocol. The SS7 network typically includes a signaling transfer point (STP) for routing the messages (data packages) among the various IN elements.

In the IN architecture, during call processing the switch analyses call related information (e.g., calling customer service profile record, dialed digits, etc.) to determine whether it requires an IN feature for routing the call or providing a calling service. If the switch detects that an IN feature should be invoked, it sends a query (data message) to the SCP over the SS7 network. In response, the SCP can assume control over call processing and execute the desired service internally or, as necessary, invoke an external resource (IP, SN or another SCP) which can deliver the desired service. Alternatively, the SCP may simply access a database and return the desired data (e.g., routing information) to the switch over the SS7 network.

Among the IN features currently under development is the number portability (NP) feature. The NP feature gives a telephone subscriber the ability to change his or her local service without having to change his or her existing telephone directory number (DN), which in the United States usually is a 10-digit number represented by NPA-NXX-XXXX (where "NPA" designates the numbering plan area in which the subscriber is located, "NXX" is a 3-digit prefix assigned to the local switch to which the subscriber is connected, and "XXXX" is a four-digit suffix assigned by the local switch operator to the subscriber). Thus, a subscriber to the NP feature may change his or her telephone service, for example, from plain old telephone service (POTS) to an integrated services digital network (ISDN), from one telephone service provider to another, or from one physical location to another, while retaining the same DN. The first phase for NP implementation, called local number portability (LNP), covers changing service providers or physical locations within a rate center while using a "portable" DN assigned by one of the networks in that rate center (i.e., a DN from a NPA-NXX number series belonging to that network and designated by that network for use as a portable number series). Such subscription changes are recorded in a LNP database maintained by the SCP of that network.

Two functions are slated to be added to the network in order to support the LNP feature, namely, the location routing number (LRN) function and the global title translation (GTT) relay function. The LRN function allows the switch that is processing a call to a portable DN to send a query containing that DN to the SCP requesting routing information for the switch to which the called DN is now connected. The SCP checks its LNP database and returns to the inquiring switch a response message containing the LRN for the switch that currently serves the called subscriber so that the call can be routed to the serving switch. The GTT relay function, on the other hand, allows the network to route queries relating to a portable DN to the appropriate destination(s). Prior to deployment of the LNP feature, the first six digits of any DN (i.e., the NPA-NXX) could be used for identifying the switch (and network) to which the corresponding subscriber is connected. However, the first six digits of a portable DN cannot be used for this identification purpose (since the subscriber now has changed location or telephone companies). The GTT relay function thus is used to determine the address for the network node(s) that provide(s) the desired service or feature for a portable subscriber (e.g., a destination point code for a particular node or a capability code specifying a group of nodes capable of performing a particular function). The GTT relay function can be implemented in a network node such as a STP, for example. Queries relating to a portable DN can be directed to the GTT relay node which translates the portable DN in the query into the correct destination address.

Another current network feature is the calling name (CNAM) delivery service, also known as the caller ID with name feature. The CNAM feature allows the customer premises equipment (CPE) of the called party to record and display the name of the calling party and the date and time of the call during the first silent interval in the ringing cycle. To effect CNAM delivery the SCP is provided with a database containing a list of DNs and corresponding subscriber names. During call processing the switch can send a message containing the calling party number to the SCP which then performs a lookup in the CNAM database to find the subscriber name associated with the calling party number. Once found in the CNAM database, the name of the calling party can be returned in a response message from the SCP to the switch which, in turn, forwards that name to the CPE of the called party.

Since the CNAM database may be shared among several switches in the network, it is possible that the SCP containing the CNAM database may become overloaded with queries for the CNAM database. The SCP therefore is provided with an automatic call/code gapping (ACG) load control function which enables the SCP to order a particular node (e.g., switch) for a particular period of time to send no more than one CNAM query for any number belonging to a particular NPA-NXX series per a certain gap interval. The duration of the overload protection period and the length of the gap interval are specified in the order from the SCP to the node. After ACG is invoked in a node against a particular NPA-NXX number series and for the duration of the overload protection period, whenever that node sends to the SCP a CNAM query for a number in that NPA-NXX series, no other CNAM query for that NPA-NXX series can be sent from that node for a time period equal to the defined gap interval. This reduces the frequency of CNAM queries by that node for that NPA-NXX series to no more than one query per gap interval.

While the ACG network management function may be considered necessary for effective deployment of the CNAM feature, application of the ACG function may lead to undesirable results in interconnected networks which support both the LNP and CNAM features, such as the three exemplary networks shown in FIG. 1. Referring to FIG. 1, for the sake of simplicity, it is assumed that in each of the three networks the LNP and CNAM features are provided by a single SCP. Thus, the first network includes a SCP 16 having a LNP database (LNP DB) 18 and a CNAM database (CNAM DB) 20, while the second network includes a SCP 36 having a LNP DB 38 and a CNAM DB 40, and the third network includes a SCP 56 having a LNP DB 58 and a CNAM DB 60. The GTT relay function is assumed to have been implemented in STPs 14, 34 and 54 in the first, second and third networks, respectively.

Assume that a subscriber 10 in the first network places a call to a subscriber 30 in the second network. Assume further that the subscriber 10 has ported his telephone number from the second network (i.e., this telephone number belongs to a portable NPA-NXX series assigned by the second network) and that the subscriber 30 has the CNAM feature activated. The call from the subscriber 10 is handled by the local switch in the end office (EO) 12 in the first network. The EO 12 analyses the dialed digits and sends call setup signaling data via STPs 14 and 34 to EO 32 in the second network where the called subscriber 30 is located. The EO 32 checks the subscriber profile for the subscriber 30 and determines that the CNAM feature is activated for this subscriber. Consequently, the EO 32 generates a CNAM query containing the calling party number (CgPN) and routes this CNAM query to the local SCP 36. Upon receiving the CNAM query, the SCP 36 will not be able to find the CgPN in the CNAM DB 40 (since the number has been ported). Thus, the SCP 36 will formulate a so-called CNAM "requery" for transmission to the STP 34 (which implements the GTT relay function necessary for routing queries for portable numbers to the appropriate destination).

With continuing reference to FIG. 1, the GTT relay function in the STP 34 in the second network will route the CNAM query received from the SCP 36 to the STP 14 which provides the GTT relay function in the first network. The STP 14 will route the CNAM query to the SCP 16 which maintains CNAM DB 20 containing the CgPN and other numbers connected to the EO 12. If the SCP 16 is in overload condition, the response message from the SCP 16 to the SCP 36 will contain an ACG order requesting SCP 36 to apply gapping (in accordance with the ACG data in the message) to subsequent CNAM requeries relating to DNs in the NPA-NXX series of the portable CgPN. However, if most of the other 9999 subscribers in this portable series reside in the third network rather than in the first network, application of gapping to this number series at the SCP 36 means that CNAM queries relating to these other subscribers (e.g., subscriber 50) are gapped by the SCP 36 even though such queries would be handled by the CNAM DB 60 at the SCP 56, which may not be under an overload condition. In other words, the CNAM overload condition in one network may result in interference with the management of CNAM operations in other networks that may not be experiencing a similar overload problem.

This interference problem also occurs if the EO 32 were to global title route the initial CNAM query instead of routing it to the SCP 36. In this case, the CNAM query would be routed from the EO 32 through the STPs 34 and 14 to the SCP 16. The CNAM response message containing the ACG order from SCP 16 would be returned to the EO 32. If most of the other 9999 subscribers in the portable NPA-NXX series of the CgPN reside in the second network or the third network, application of gapping to this series at the EO 32 means that CNAM queries relating to these other subscribers are gapped by the EO 32 even though such queries would be handled by the SCP 36 or the SCP 56, which may not be under an overload condition.

SUMMARY OF THE INVENTION

In view of the interference problem caused by interaction of the LNP and CNAM features in prior art networks, there is a need for a solution which can avoid unnecessary gapping of CNAM queries related to numbers in a portable series when the SCP which handles CNAM queries in the network to which one or more, but not necessarily all, of the numbers in this series have been ported is in an overload condition, while the SCPs which handle CNAM queries in other networks where the other numbers in this series reside are not overloaded. The present invention, as described below, provides the needed solution.

In accordance with the present invention, CNAM queries involving any calling party number (CgPN) that is in a portable series can be directed to an application in the local SCP which can determine the location routing number (LRN) associated with that portable number. The local SCP application can obtain the LRN for any portable number within a rate center from the LNP DB in the local network. Alternatively, the local SCP application may maintain its own database of portable numbers and their respective LRNs. As the first six digits of each LRN (or the NPA-NXX portion of the LRN) identify the remote switch or end office (EO) to which the associated portable number is connected, that portion can be used to identify the remote CNAM DB in which the name of the calling party is stored.

Upon receiving a CNAM query containing a portable CgPN, the local SCP application will generate a new CNAM query (requery) which is routed through the GTT relay node to the remote CNAM DB using the CgPN received in the original CNAM query. The local SCP application also will save the corresponding LRN (or at least the first six digits, or NPA-NXX portion, of this LRN) for use in performing call gapping in the event that the SCP which handles the remote CNAM DB is found to be in an overload condition, as may be indicated in the response to the CNAM requery. If code gapping is indicated in the response from the remote SCP, the local SCP application will initiate code gapping on subsequent CNAM requeries containing either portable numbers that are associated with the same LRN as the saved LRN, or non-portable numbers belonging to the same number series (NPA-NXX) as the saved LRN (instead of applying gapping to CNAM requeries involving numbers in the same number series as the portable CgPN, as in the prior art).

On the other hand, if the original CNAM query to the local SCP application involves a non-portable CgPN belonging to a number series in another network, the local SCP application will route a CNAM requery to the remote CNAM DB in that network using the non-portable CgPN, but not the GTT relay function since the CgPN is not a portable number. If code gapping is indicated in the response from the remote SCP which handles the remote CNAM DB, the local SCP application will apply gapping to subsequent CNAM requeries containing non-portable numbers belonging to the same number series (NPA-NXX) as the CgPN (in this case, as the CgPN is a non-portable number, gapping can be applied to the NPA-NXX of the CgPN since that NPA-NXX correctly identifies the switch to which the CgPN is connected as well as the remote CNAM DB in which the name of the corresponding subscriber is stored).

In the foregoing manner, regardless of whether the original CNAM query involved a portable or non-portable CgPN, call gapping will be applied to subsequent CNAM queries destined to the CNAM DB node which ordered the gapping rather than to a CNAM DB node which is not under overload.

In one aspect, the present invention provides a service control point (SCP) in one of a plurality of telephone networks including a plurality of subscribers each assigned a telephone number in a predetermined number series associated with a particular switch in one of the telephone networks, with one or more of the number series being designated as portable number series and including telephone numbers assigned to a switch in one network but capable of being connected to a switch in another network, while each of the other number series including non-portable telephone numbers assigned to a switch in one network and connected to that same switch in that same network.

The SCP of the present invention comprises a calling name (CNAM) database (CNAM DB) for storing a plurality of telephone numbers and corresponding names of subscribers; means for receiving a CNAM query to the CNAM DB, the CNAM query containing the telephone number of a subscriber that has placed a call to another subscriber; means for providing the name of the calling subscriber if the telephone number of the calling subscriber is stored in the CNAM DB; means for sending a CNAM requery to a CNAM DB in another network if the telephone number of the calling subscriber is not stored in the CNAM DB, the CNAM requery containing the telephone number of the calling subscriber; means for receiving a gapping order in a response from the other network, the gapping order specifying the gapping of subsequent CNAM requeries containing telephone numbers belonging to the same number series as the telephone number of the calling subscriber; and means for responding to the gapping order from the other network (a) by gapping subsequent CNAM requeries containing either portable telephone numbers that are associated with a location routing number (LRN) which identifies the switch and the network to which the telephone number of the calling subscriber is connected, or non-portable telephone numbers belonging to the same number series as that LRN, if the telephone number of the calling subscriber is a portable telephone number, and (b) by gapping subsequent CNAM requeries containing non-portable telephone numbers belonging to the same number series as the telephone number of the calling subscriber, if the telephone number of the calling subscriber is a non-portable telephone number.

In another aspect, the present invention provides a method for managing calling name databases (CNAM DBs) in a plurality of telephone networks comprising a plurality of subscribers each having a telephone number in a predetermined number series associated with a particular switch in one of the telephone networks, with one or more of the number series being designated as a portable number series and including telephone numbers assigned to a switch in one network but capable of being connected to a switch in another network, while each of the other number series including non-portable telephone numbers assigned to a switch in one network and connected to that same switch in that same network, and with each of the networks including a CNAM DB for storing a plurality of telephone numbers and corresponding names of subscribers connected to the switch in that network.

The method of the present invention comprises the steps of detecting a call from a calling subscriber in one of the networks to a called subscriber in another one of the networks; determining whether the telephone number of the calling subscriber is a portable number or a non-portable number; if the telephone number of the calling subscriber is a portable number, obtaining a location routing number (LRN) associated with the telephone number of the calling subscriber, the LRN being used to identify the switch and the network of the calling subscriber; if the telephone number of the calling subscriber is a non-portable number, using the telephone number of the calling subscriber to identify the switch and the network of the calling subscriber; sending from the network of the called subscriber to the CNAM DB in the network of the calling subscriber a CNAM query containing the telephone number of the calling subscriber; receiving at the network of the called subscriber in response to the CNAM query a gapping order from the network of the calling subscriber specifying the gapping of subsequent CNAM queries containing telephone numbers belonging to the same number series as the telephone number of the calling subscriber; if the telephone number of the calling subscriber was determined to be a portable number, gapping at the network of the called subscriber subsequent CNAM queries containing either portable numbers that are associated with the LRN or non-portable numbers belonging to the same number series as the LRN; and if the telephone number of the calling subscriber was determined to be a non-portable number, gapping at the network of the called subscriber subsequent CNAM queries containing non-portable numbers belonging to the same number series as the telephone number of the calling subscriber.

These and other aspects of the present invention will be further appreciated from the accompanying drawings and the detailed description as set forth below.

BRIEF DESCRIPTION OF THE DRAWINGS

The present invention will be better understood and its numerous objects and advantages will become apparent to those skilled in the art by reference to the following drawings in which.

DETAILED DESCRIPTION OF THE INVENTION

Figure 2A:
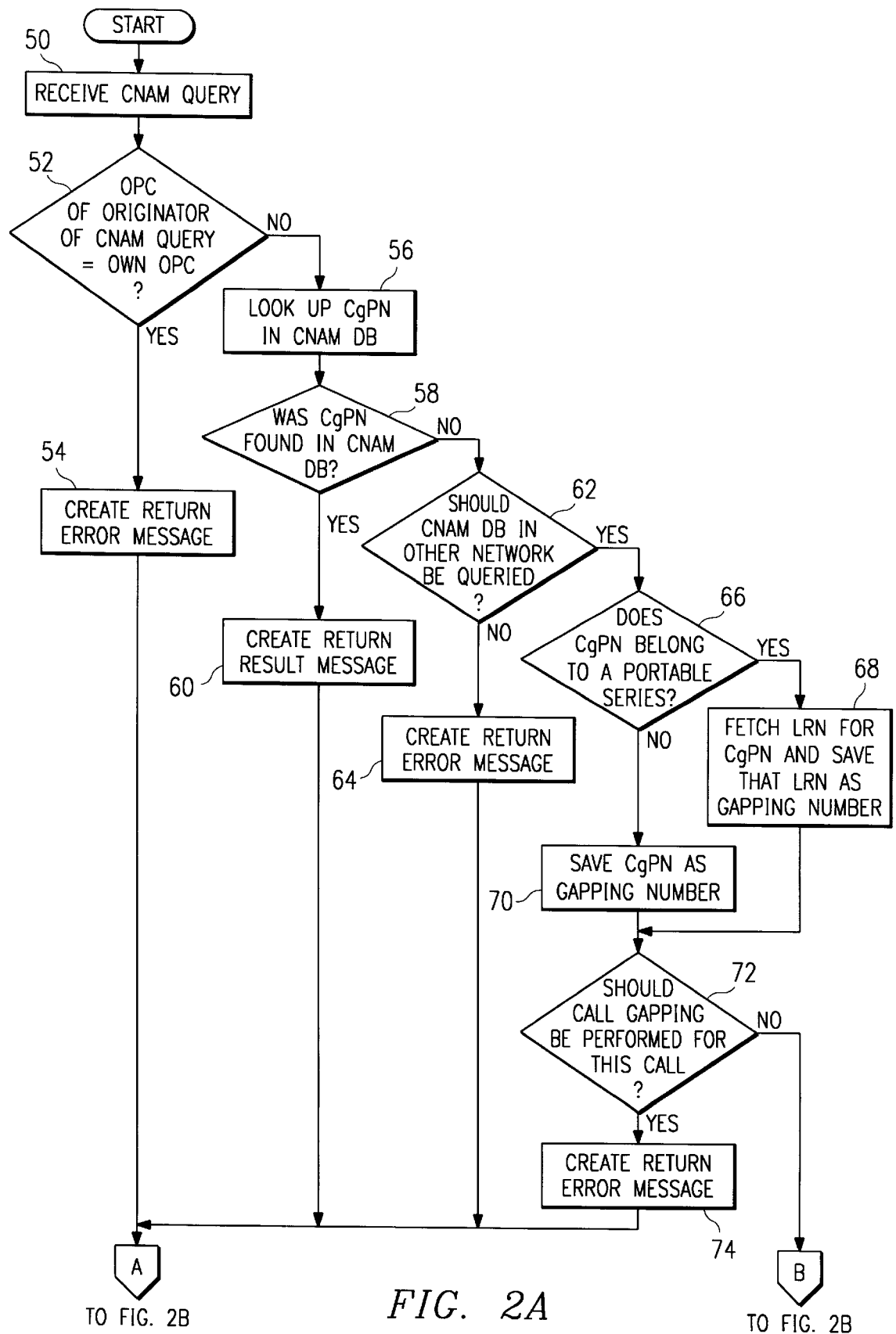
FIGS. 2A–B together show a flowchart of the steps executed by a SCP constructed in accordance with the present invention.
Figure 2B:
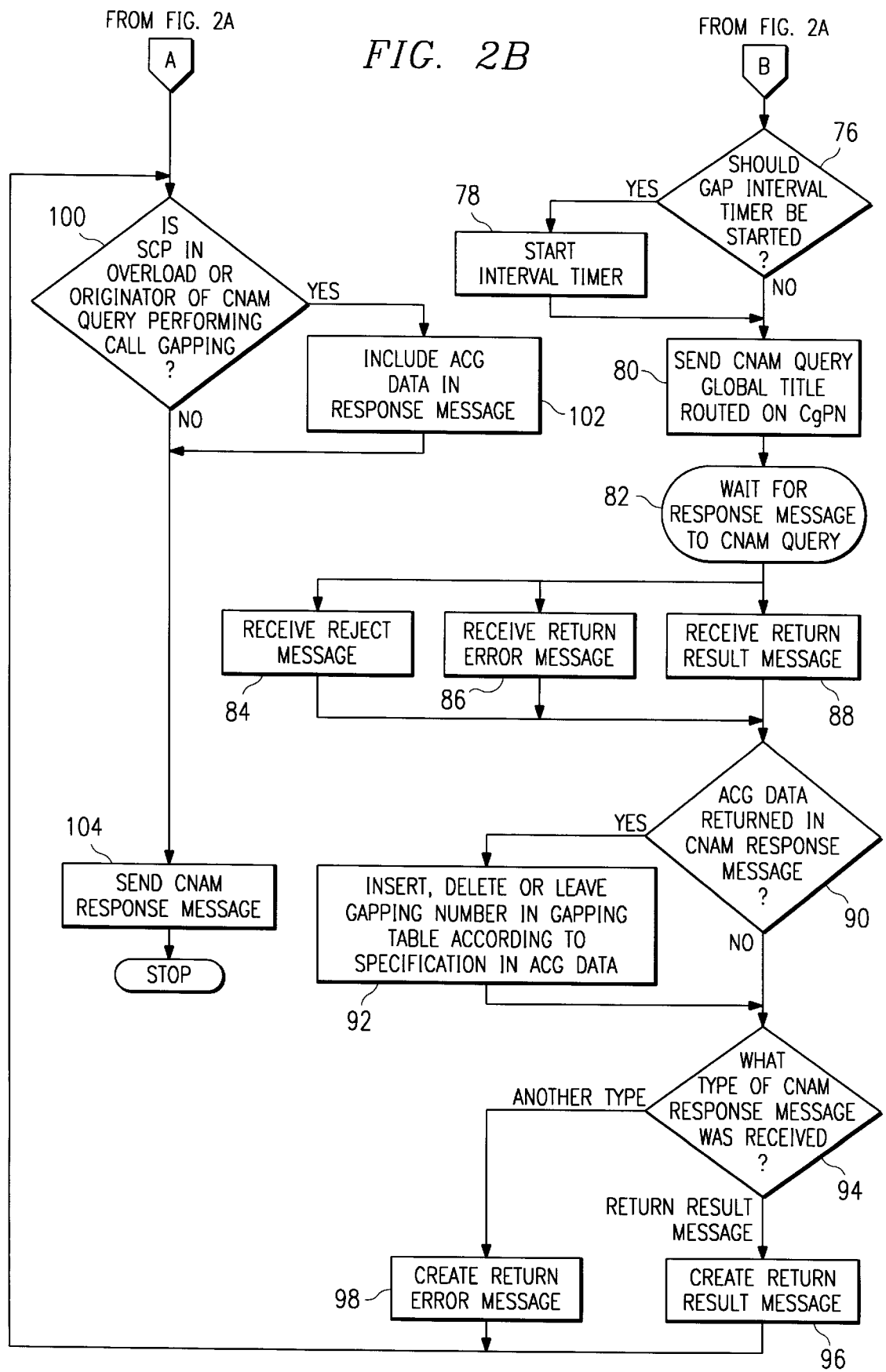

Referring now to FIGS. 2A–B, there is shown a flowchart of the steps executed by a SCP constructed in accordance with the present invention. These steps are executed in the manner shown whenever the SCP receives a CNAM query for a given call, as indicated at block 50 in FIG. 2A. The CNAM query may be received, for example, from an EO in the local network or from a SCP in a remote network. At block 52, the SCP determines whether it or some other node is the originator of the received CNAM query by comparing the origination point code (OPC) in the CNAM query to its own OPC (as well known in the art, each node in the network is identified by a unique OPC which is included in all global title routed messages originating from that node). This particular step is performed in order to prevent any possibility of an "endless loop" through the flowchart in FIGS. 2A–2B where this SCP itself is the originator of the CNAM query. In that case, the SCP will generate a "Return Error" message as shown at block 54. On the other hand, if the originator of the CNAM query is another node in the network, the SCP proceeds to block 56 and indexes the CNAM DB with the calling party number (CgPN) in the received CNAM query in an attempt to find the name of the calling party.

At step 58, the SCP determines whether the CgPN was found in the CNAM DB. If the CgPN was found in the CNAM DB, the SCP will generate a "Return Result" message containing the name of the calling party, as shown at block 60. However, if the CgPN was not found in the CNAM DB, thus implying that the calling party is connected to a switch in another network, the SCP next determines at step 62 whether the CNAM DB in the network of the calling party can be queried for purposes of obtaining the calling party name. This determination may be based, for example, on whether there is an agreement with the other network for the exchange of CNAM data, whether this SCP contains the functionality for formulating a CNAM requery, and other similar considerations. If the CNAM DB in the other network cannot be queried, the SCP will generate a "Return Error" message as shown at block 64. On the other hand, if the SCP determines that the CNAM DB in the other network should be queried, the SCP will next determine at step 66 whether the CgPN on which to query the other network belongs to a portable number series. If the CgPN is in a portable series, the SCP at block 68 will fetch the location routing number (LRN) from the LNP DB, and will save that LRN (or its NPA-NXX portion) as the gapping number to which gapping will be applied, if necessary.

Figures 1, 3:
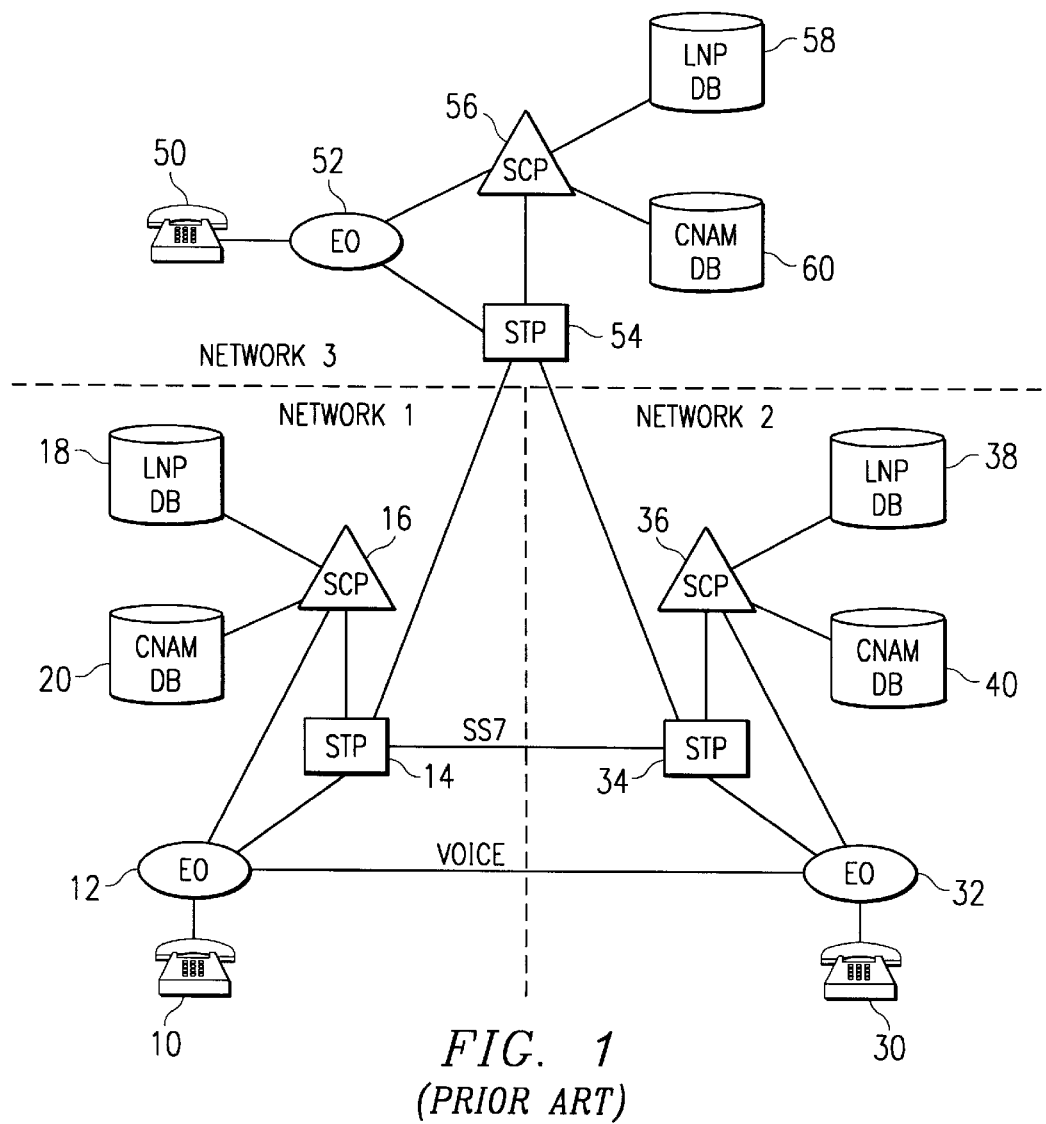
FIG. 1 is a block diagram of three exemplary prior art networks each of which includes a service control point (SCP) for providing calling services.
FIG. 3 is an illustration of a call gapping table used by the SCP in FIG. 2.

With continuing reference to FIG. 2A, and more specifically to block 66, if the CgPN is found not to belong to a portable series, the SCP proceeds to block 70 and saves the CgPN as the gapping number. The SCP next determines at block 72 whether call gapping should be performed for this call (i.e., this CNAM query). For this purpose the SCP will consult a call gapping table 110 as shown in FIG. 3. The call gapping table 110 stores a list of gapping numbers (CgPNs and/or LRNs) and associated values for the gap interval timer. A gapping number becomes listed in the gapping table 110 whenever the SCP receives an automatic call gapping (ACG) order in a response to a CNAM query involving the CgPN corresponding to that gapping number. At that time, the SCP will set the gap duration and gap interval timers to the values indicated in the ACG data. Returning to step 72, the SCP will apply call gapping to this call if the gapping number for this call (as determined at blocks 66–70) is present in the gapping table 110 and the associated gap interval timer has not expired. If both of these conditions are met, the SCP at block 74 will create a "Return Error" message since it cannot at this time send a CNAM requery to the other network.

On the other hand, if call gapping need not to be applied at this time, the SCP proceeds to step 76 in FIG. 2B and determines whether the gap interval timer for any gapping number stored in the gapping table 110 should be started. This step basically resolves to a determination of whether the gapping number for this call (as determined at blocks 66–70) is present in the gapping table 110. If so, the gap interval timer for this gapping number will be started, as shown at block 78, since the SCP will now be sending out a CNAM requery for the CgPN corresponding to this gapping number, the CNAM requery being Global Title routed to the CNAM DB in the other network as shown at block 80. At block 82, the SCP awaits the receipt of a response message from the other network. As shown at blocks 84, 86 and 88, the response message received by the SCP from the other network could be a "Reject" message, a "Return Error" message or a "Return Result" message, respectively. The "Reject" message will be sent by the other network if, for example, there was a transmission error or certain types of formatting errors in the CNAM requery sent by the SCP. The "Return Error" message will be sent by the other network if, for example, it was unable to locate the CgPN in its CNAM DB or if the CNAM DB was unavailable. The "Return Result" message, on the other hand, will be sent by the other network if it was successful in locating the CgPN in its CNAM DB.

With continuing reference to FIG. 2B, once the CNAM response message is received from the other network, the SCP at block 90 determines whether an ACG parameter was included in the CNAM response message. If an ACG parameter is detected in the CNAM response message, the SCP at block 92 will insert, delete or leave the gapping number for this call in the gapping table 110 as specified in the received ACG data. Otherwise, the SCP will proceed directly to block 94 and determine the type of the CNAM response message received from the other network so as to generate the proper response to the originator of the CNAM query. If the CNAM response message received from the other network is of the type "Return Result" message, the SCP will generate a corresponding "Return Result" message (containing the calling party name) as shown at block 96. However, if the CNAM response message received from the other network is of another message type (i.e., "Reject" or "Return Error" message), the SCP will generate a "Return Error" message as shown at block 98. In either case, the SCP will proceed to block 100 in order to determine whether to include ACG data in its response message to the originator of the CNAM query (note that block 100 in FIG. 2B may also be reached from block 54, 60, 64 or 74 in FIG. 2A). At block 100 the SCP checks whether it is in overload condition and whether the originator of the CNAM query is currently performing call gapping (pursuant to previously sent instructions from the SCP). If either of these two conditions is true, the SCP at block 102 will include appropriate ACG data in the response message to the originator of the CNAM query so as to initiate or update call gapping at that node. The response message, with or without ACG data as applicable, is sent to the originator of the CNAM query at block 104.

It will be readily appreciated from the flowchart in FIGS. 2A–B that if the calling party number (CgPN) is in a portable series and the CNAM DB in the other network which stores this CgPN is in overload condition as indicated by the presence of the corresponding LRN in the gapping table 110, the SCP will perform call gapping on the NPA-NXX of the LRN instead of the CgPN. Thus, the network management of the CNAM DB in one network will not adversely interfere with the network management of the CNAM DB in any other network.

While certain forms or embodiments of the present invention have been illustrated above, those skilled in the art will readily recognize that many modifications and variations may be made to the forms and embodiments of the present invention disclosed herein without substantially departing from the spirit and scope of the present invention. Accordingly, the form of the invention disclosed herein is exemplary and is not intended as a limitation on the scope of the invention as defined in the following claims.

I claim:

1. In a plurality of telephone networks including a plurality of subscribers each assigned a telephone number from a predetermined number series associated with a particular switch in one of the telephone networks, at least one of said number series being designated as a portable number series and including telephone numbers assigned to a switch in one network but capable of being connected to a switch in another network, each of the other number series including non-portable telephone numbers assigned to a switch in one network and connected to that same switch in that same network, a service control point (SCP) in one of said networks comprising:

a calling name (CNAM) database (CNAM DB) for storing a plurality of telephone numbers and corresponding names of subscribers;

means for receiving a CNAM query to said CNAM DB, said CNAM query containing the telephone number of a subscriber that has placed a call to another subscriber;

means for providing the name of the calling subscriber if the telephone number of said calling subscriber is stored in said CNAM DB;

means for sending a CNAM requery to a CNAM DB in another network if the telephone number of said calling subscriber is not stored in said CNAM DB, said CNAM requery containing the telephone number of said calling subscriber;

means for receiving a gapping order in a response from said other network, said gapping order specifying the gapping of subsequent CNAM requeries containing telephone numbers belonging to the same number series as the telephone number of said calling subscriber; and means for responding to said gapping order from said other network (a) by gapping subsequent CNAM requeries containing either portable telephone numbers that are associated with a location routing number (LRN) which identifies the switch and the network to which the telephone number of said calling subscriber is connected, or non-portable telephone numbers belonging to the same number series as said LRN, if the telephone number of said calling subscriber is a portable telephone number, or (b) by gapping subsequent CNAM requeries containing non-portable telephone numbers belonging to the same number series as the telephone number of said calling subscriber, if the telephone number of said calling subscriber is a non-portable telephone number.

2. The SCP of claim 1 wherein each telephone number series associated with a particular switch in one of the telephone networks is identified by a six-digit sequence represented by NPA-NXX, where NPA is a three-digit designation for the numbering plan area of that network, and NXX is a three-digit prefix used by that switch in that network.

3. The SCP of claim 1 wherein said SCP receives said CNAM query from an end office (EO) to which the telephone number of said called subscriber is connected.

4. The SCP of claim 1 wherein said SCP receives said CNAM query from a SCP in the network of said called subscriber.

5. The SCP of claim 1 wherein said LRN comprises a six-digit sequence represented by NPA-NXX, where NPA is a three-digit designation for the numbering plan area of the network to which the telephone number of said calling subscriber is connected, and NXX is a three-digit prefix used by that network.

6. In a plurality of telephone networks including a plurality of switches assigned a plurality of telephone number series, each of said telephone number series represented by a unique multi-digit sequence which identifies a switch in one of said networks, at least one of said telephone number series being used as a portable number series and including telephone numbers assigned to a switch in one network but connected to a switch in another network, each of said networks including a calling name (CNAM) database (CNAM DB) for storing the telephone numbers and respective names of subscribers that are connected to a switch in that network, each of said CNAM DBs being operative to provide the name of a subscriber whose telephone number is stored in that CNAM DB in response to a CNAM query containing that telephone number, and each of said CNAM DBs being further operative when in overload condition to order gapping of CNAM queries containing telephone numbers in a particular number series represented by a particular multi-digit sequence, a method for managing the CNAM DBs in said networks comprising the steps of:

detecting a call from a calling party to a called party in said networks;

sending a CNAM query to the CNAM DB in the network of the called party, said CNAM query containing the calling party number (CgPN);

determining whether the CgPN is in the CNAM DB in the network of the called party;

if said CgPN is in the CNAM DB of the called party, generate a result message containing the calling party name corresponding to said CgPN in the CNAM DB of the network of the called party;

if said CgPN is not in the CNAM DB of the network of the called party, determining whether said CgPN belongs to a portable number series;

if said CgPN does not belong to a portable number series, save said CgPN as a gapping number;

if said CgPN belongs to a portable number series, fetch a location routing number (LRN) which includes a multi-digit sequence identifying the switch and the network to which the calling party is connected, and save said LRN as a gapping number;

determine whether gapping is activated for the multi-digit sequence in said gapping number;

if gapping is activated for the multi-digit sequence in said gapping number, generate an error message;

if gapping is not activated for the multi-digit sequence in said gapping number, generate a CNAM requery containing said CgPN, and route said CNAM requery to the CNAM DB of another network identified by the multi-digit sequence in said CgPN or, if said CgPN belongs to a portable series, the multi-digit sequence in said LRN;

determine the contents of a response received from the CNAM DB of the other network;

if the response received from the CNAM DB of the other network contains gapping instructions, activate or deactivate gapping for the multi-digit sequence in said gapping number in accordance with the received gapping instructions;

if the response received from the CNAM DB of the other network does not contain the calling party name, generate an error message;

if the response received from the CNAM DB of the other network contains the calling party name, generate a result message containing the received calling party name;

determine whether the CNAM DB in the network of the called party is in overload condition;

if the CNAM DB in the network of the called party is in overload condition, include gapping instructions in said error message or said result message; and send said error message or said result message to an originator of said CNAM query for delivery to said called party.

7. The method of claim 6 wherein said multi-digit sequence for any telephone number series assigned to any switch in any of said networks comprises a six-digit sequence in which the first three digits designate the numbering plan area of that network and the last three digits designate that switch in that network.

8. The method of claim 6 wherein the CNAM DB in each of said networks is administered by a service control point (SCP).

9. The method of claim 6 wherein the originator of said CNAM query is an end office (EO) to which the called party is connected.

10. The method of claim 6 wherein the originator of said CNAM requery is a service control point (SCP) in the network of the called party.

11. In a plurality of telephone networks comprising a plurality of subscribers each having a telephone number in a predetermined number series associated with a particular switch in one of the telephone networks, at least one of said number series being designated as a portable number series and including telephone numbers assigned to a switch in one network but capable of being connected to a switch in another network, each of the other number series including non-portable telephone numbers assigned to a switch in one network and connected to that same switch in that same network, and each of said networks including a calling name (CNAM) database (CNAM DB) for storing a plurality of telephone numbers and corresponding names of subscribers connected to the switch in that network, a method for managing said CNAM DBs comprising the steps of:

detecting a call from a calling subscriber in one of said networks to a called subscriber in another one of said networks;

determining whether the telephone number of said calling subscriber is a portable number or a non-portable number;

if the telephone number of said calling subscriber is a portable number, obtaining a location routing number (LRN) associated with the telephone number of said calling subscriber, said LRN being used to identify the switch and the network of said calling subscriber;

if the telephone number of said calling subscriber is a non-portable number, using the telephone number of said calling subscriber to identify the switch and the network of said calling subscriber;

sending from the network of said called subscriber to the CNAM DB in the network of said calling subscriber a CNAM query containing the telephone number of said calling subscriber;

receiving at the network of said called subscriber in response to said CNAM query a gapping order from the network of said calling subscriber specifying the gapping of subsequent CNAM queries containing telephone numbers belonging to the same number series as the telephone number of said calling subscriber;

if the telephone number of said calling subscriber was determined to be a portable number, gapping at the network of said called subscriber subsequent CNAM queries containing either portable numbers that are associated with said LRN or non-portable numbers belonging to the same number series as said LRN; and if the telephone number of said calling subscriber was determined to be a non-portable number, gapping at the network of said called subscriber subsequent CNAM queries containing non-portable numbers belonging to the same number series as the telephone number of said calling subscriber.

12. The method of claim 11 wherein each telephone number series associated with a particular switch in one of the telephone networks is identified by a six-digit sequence represented by NPA-NXX, where NPA is a three-digit designation for the numbering plan area of that network, and NXX is a three-digit prefix used by that switch in that network.

13. The method of claim 11 wherein said CNAM query is generated by an end office (EO) in the network of said called subscriber.

14. The method of claim 11 wherein said CNAM query is generated by a service control point (SCP) in the network of said called subscriber.

15. The method of claim 11 wherein said CNAM query is received by a service control point (SCP) which handles the CNAM DB in the network of said calling subscriber.

* * * * *